United States Patent [19]

Schall

[11] 4,342,845

[45] Aug. 3, 1982

[54] VINYL HALIDE-POLYOLEFIN POLYMER AND COPOLYMERS AND METHOD OF MAKING

[75] Inventor: William L. Schall, Grand Island, N.Y.

[73] Assignee: Hooker Chemicals & Plastics Corp., Niagara Falls, N.Y.

[21] Appl. No.: 193,560

[22] Filed: Oct. 3, 1980

[51] Int. Cl.³ ............... C08F 255/02; C08F 255/04; C08F 255/06

[52] U.S. Cl. .................. 525/53; 525/289; 525/317

[58] Field of Search ............ C08F/255/10; 525/317, 525/289, 53

[56] References Cited

U.S. PATENT DOCUMENTS

| | | | |
|---|---|---|---|
| 2,715,117 | 8/1955 | Baeyaert | 260/92.8 |
| 2,947,719 | 8/1960 | Rugg et al. | 525/265 |
| 3,347,956 | 10/1967 | Rademacher | 260/878 |
| 3,522,227 | 7/1970 | Thomas | 526/344.1 |
| 3,789,083 | 1/1974 | Dumoulin et al. | 525/317 |
| 3,812,204 | 5/1974 | Natta et al. | 525/315 |
| 4,007,235 | 2/1977 | Walker | 525/315 |
| 4,067,928 | 1/1978 | Walker | 525/317 |
| 4,071,582 | 1/1978 | Takahashi | 525/317 |
| 4,163,033 | 7/1979 | Takahashi | 525/289 |
| 4,169,870 | 10/1979 | Takahashi | 525/315 |
| 4,195,137 | 3/1980 | Walker | 525/317 |
| 4,205,149 | 5/1980 | Cich et al. | 528/501 |

FOREIGN PATENT DOCUMENTS 814393 6/1959 United Kingdom .
852042 10/1960 United Kingdom .
1047489 11/1966 United Kingdom .

OTHER PUBLICATIONS

German Offenlegungsschrift No. 2,009,137, 11-5-70.
"Polyvinyl Chloride," Sarvetnick, H. A., pp. 223-228, Reinhold Plastics Applications Series, (1969).
Pennwalt Product Bulletin, "Peroxydicarbonates", (undated).

*Primary Examiner*—Stanford M. Levin
*Attorney, Agent, or Firm*—James F. Tao; James F. Mudd

[57] ABSTRACT

The present invention relates to production of vinyl halide-polyolefin graft copolymers by a liquid phase bulk polymerization process wherein the process is carried out in the presence of a diluent. Suitable diluents preferably have vaporization pressure characteristics, within 100 psi., and similar liquid state viscosity, as vinyl halide monomer. The diluents are soluble in vinyl halide monomer under reaction conditions and are inert to the polymerization mass. The diluents are straight or branched chain, or cyclic saturated hydrocarbons having from about 3 to about 15 carbon atoms and, more preferably, from about 4 to about 8 carbon atoms. Particularly useful diluents are n-propane, n-butane, isobutane or mixtures thereof. The diluents are utilized in amounts from about 0.2 to less than about 50.0 percent based upon the total weight of the reaction charge.

31 Claims, No Drawings

VINYL HALIDE-POLYOLEFIN POLYMER AND COPOLYMERS AND METHOD OF MAKING

BACKGROUND OF THE INVENTION

The present invention relates to graft copolymers of a vinyl halide monomer, such as a vinyl chloride, or of a vinyl halide monomer and a comonomer copolymerizable therewith, on a polyolefin, i.e. an olefin trunk polymer, and to methods of preparing such graft copolymer products. The present graft copolymer products are aptly produced using a liquid phase bulk polymerization process. The present process substantially reduces the residual vinyl halide monomer, e.g. vinyl chloride monomer, in the graft copolymerized product while yielding a product of consistent, reduced grain size and improved color. In addition, scale build-up in the reaction vessel or vessels during a liquid phase bulk polymerization process is substantially reduced. The graft copolymer products have improved molding characteristics and are useful in the production of films, coatings and molded articles, where smooth, even surface areas and good contact clarity are desired.

The vinyl halide-polyolefin graft copolymeric products of the present invention comprise a graft copolymer of a vinyl halide (or of a vinyl halide and a comonomer copolymerizable therewith) and a polyolefin. Such copolymer products are hereinafter referred to as "vinyl halide-polyolefin graft copolymers". Such copolymers may be produced by polymerizing a mixture of vinyl halide monomer with one or more ethylenically unsaturated comonomers (or more conveniently, a vinyl halide monomer alone) in the presence of an olefin trunk polymer reactant.

Suitable ethylenically unsaturated comonomer materials which can be used include: ethylene, propylene, butene-1,4,4-dimethylbutene-1, decene-1, styrene and its nuclear alpha-alkyl or aryl substituted derivatives, e.g. o-, m- or o-methyl, ethyl or butyl styrene; and halogenated styrenes, such as alpha-chloro-styrene; mono-olefinically unsaturated esters including, vinyl esters such as vinyl acetate, vinyl propionate, vinyl butyrate, vinyl stearate vinyl benzoate, vinyl-p-chlorobenzoates, alkyl methacrylates, e.g. methyl, ethyl, propyl and stearyl methacrylate, alkyl crotonates, e.g. octyl crotonate; alkyl acrylates, e.g. methyl, 2-ethyl hexyl, stearyl acrylates; hydroxyether and tertiary butylamino acrylates, e.g. 2-ethoxy ethyl acrylate, isopropenyl esters, e.g. isopropenyl acetate; isopropenyl halides, e.g. isopropenyl chloride; vinyl esters of halogenated acids, e.g. vinyl alpha-chloroacetate, and vinyl alpha-bromo-propionate; allyl and methallyl esters, e.g. allyl chloride, allyl cyanide; allyl chlorocarbonate, allyl nitrate, allyl formate and allyl acetate and the corresponding methallyl compounds; esters or alkenyl alcohols, e.g. beta-ethyl allyl alcohol; halo-alkyl acrylates e.g. methyl and ethyl alpha-chloroacrylates; allyl alpha-cyanoacrylates, e.g. methyl alpha-cyanoacrylate; itaconates, e.g. monomethyl itaconate, diethyl itaconate, alcohol (C-3 to C-8) itaconates; maleates, e.g. monomethyl maleate, diethyl maleate, alcohol (C-3 to C-8) maleates; and fumarates, e.g. monomethyl fumarate, diethyl fumarate, alcohol (C-3 to C-8) fumarates, and diethyl glutaconate; mono-olefinically unsaturated organic nitriles including, for example, fumaronitrile, acrylonitrile, methacrylonitrile, 1,1-dicyanopropene-1, and oleonitrile; mono-olefinically unsaturated carboxylic acids including, for example, acrylic acid, methacrylic acid, cinnamic acid, maleic and itaconic acids, maleic anhydride and the like. Amides of these acids, such as acrylamide, are also useful. Vinyl alkyl ethers and vinyl ethers, e.g. vinyl methyl ether, vinyl ethyl ether, vinyl 2-chloroethyl ether, vinyl cetyl ether, and the like; and vinyl sulfides, e.g. vinyl beta-chloroethyl sulfide, vinyl betaethoxyethyl sulfide, and the like can also be included as can diolefinically unsaturated hydrocarbons containing two olefinic groups in conjugated relation and the halogen derivatives thereof, e.g. butadiene-1,e; 2-methyl-butadiene-1,3; 2,3-dichlorobutadiene-1,3; and 2-bromo-butadiene-1,3, and the like.

The polyolefin component may be a homopolymer, bipolymer, terpolymer, tetrapolymer or higher copolymer of olefinic monomers. The olefin polymers can also contain the residue of a polyene, e.g. a non-conjugated diene as a monomer unit. Preferably, the polyolefin component is an elastomer.

Olefin homopolymers may be obtained by the polymerization of a suitable monomer, such as ethene, propene, i.e. propylene, butene-1, isobutene, octene, or 5-methylhexene-1.

Suitable comonomers for use in preparing the olefin trunk copolymers are those utilized to prepare the olefin trunk homopolymers as listed above, e.g. propene or butene-1 with ethene and the like. Suitable termonomers are those utilized to prepare the olefin trunk homopolymers and copolymers as disclosed above, such as propene, ethene and the like, as well as a polyene. Especially suitable polyene-derived ter- and higher copolymers can be prepared from olefin monomer mixtures containing up to 15 percent, preferably up to about 6 percent by weight, of the polyene (preferably non-conjugated), e.g. dicyclopentadiene, cyclooctadiene and other dienes with linear or cyclic chains. The polyolefin used may also be a halogenated polyolefin, e.g. a chlorinated, brominated or fluorinates polyolefin.

The polyolefins used as trunk polymers are characterized by being soluble, partially soluble or dispersible at the polymerization temperature and pressure in the liquid halide monomer reactant (or mixture thereof with comonomer copolymerizable with the vinyl halide), and in having, typically, monomeric units of 2 to 8 carbon atoms. The weight average molecular weight of the olefin polymers, copolymers, terpolymers and tetrapolymers can vary from about 50,000 to about 1,000,000 or higher. Preferred as polyolefin rubbers for use in preparing vinyl halide graft polymers for use in the invention are ethene-propene polyolefin elastomers and ethene-propene-diene polyolefin elastomers.

More particularly, the hydrocarbon olefin polymers which are suitable employed as trunk polymer reactant in the preparation of the present graft polymers is an elastomer having a weight average molecular weight of about 50,000 to 1,000,000, preferably, of about 50,000 to 300,000, which is soluble, partially soluble or dispersible in the liquid phase polymerization reaction mixture. The trunk polyolefin reactant is suitable selected from the group consisting of:

(A) a homopolymer of an aliphatic hydrocarbon olefin monomer of 2 to 8 carbon atoms;

(B) a copolymer of 2 or more of said olefin monomers; and (C) a polymer of at least one of said olefin monomers and no more than 15 percent, based on the weight of the polymer, of a non-conjugated aliphatic hydrocarbon polyene of 4 to 18 carbon atoms wherein all of the carbon-to-carbon double bonds do not form a conjugated system.

Typically, the aliphatic hydrocarbon olefin monomer of the trunk polyolefin is ethene (i.e. ethylene), propene, butene-1, isobutene, octene or 5-methylhexene-1. Typically, the hydrocarbon polyene employed as an optional component of the trunk polyolefin is a linear of cyclic polyene, such as 1,4-hexadiene dicyclopentadiene, ethylidene norbornene and the mono- and di-Diels Alder adducts of cyclopentadiene. The polyene which is present in the polyene-modified trunk polymer is preferably a diene, and the proportion of the polyene in the trunk polymer is preferably no more than about 6 percent. The trunk polymer employed in preparing the graft polymer component of the present compositions is preferably a copolymer of two or more of the above-defined aliphatic hydrocarbon olefins (typified by ethylene-propylene copolymer rubber) or a polymer of at least one of said hydrocarbon olefin monomers and the polyene. An especially good graft polymer is obtained by employing as trunk polyolefin a terpolymer, i.e. ternary copolymer, of two different olefin monomers and a diene, for example, an ethylene-propylene-ethylidene norbornene elastomer.

The vinyl halide-graft copolymers of the polyolefin elastomers are prepared by polymerizing the vinyl halide in the presence of about 0.05 to about 20 percent, preferably about 1 to about 10 percent, more preferably 4 to about 10 percent, based on the weight of vinyl halide monomer (or mixture thereof with a comonomer copolymerizable with vinyl halide) of the above-described polyolefin elastomer. Preparation of such vinyl halide-polyolefin graft copolymer according to emulsion and suspension polymerization techniques is described in G. Natta et al, U.S. Pat. No. 3,812,204, the disclosure of which is incorporated herein by reference. Preparation of such vinyl halidepolyolefin graft copolymer by vapor phase and solution polymerization techniques are described, respectively, in J. Dumoulin et al, U.S. Pat. No. 3,789,083 and F. M. Rugg et al, U.S. Pat. No. 2,947,719, the disclosures of which are incorporated herein by reference. Conveniently, the preparation of the vinyl halide-polyolefin graft copolymers useful as the polyvinyl halide component of the compositions of the invention is effected by a bulk liquid phase polymerization technique as described by A. Takahashi, U.S. Pat. No. 4,071,582; U.S. Pat. No. 4,163,033 and U.S. Pat. No. 4,169,870 and by L. E. Walker, U.S. Pat. Nos. 4,007,235; 4,067,928 and 4,195,137, the disclosure of which Takahashi and Walker patents is also incorporated herein by reference.

The vinyl halide-polyolefin graft copolymer, especially the graft copolymer product prepared by a liquid phase bulk polymerization reaction, has a substantially enhanced impact resistance at both ambient temperature and sub-ambient temperatures, compared to the conventional, i.e. ungrafted, vinyl halide polymers, even when the latter are blended with a conventional polyvinyl halide impact modifying polymer additive. The bulk polymerization prepared graft polymer product is even distinguished from the corresponding graft polymer prepared by a non-bulk polymerization technique, e.g. suspension polymerization, by an enhanced impact resistance at both low and ambient temperature and by breakage by the desirable ductile breakage mode rather than by an undesirable brittle breakage mode.

The present polymerization process may be carried out in one or more stages. The present process is particularly suited to be carried out using a two-stage liquid phase bulk polymerization process involving high speed agitation during a first stage in which about 3 to about 20 percent, preferably about 3 to about 15 percent, more preferably about 7 to about 12 percent, by weight of the monomer or monomers are converted to polymer and subsequently polymerization in a second stage involving low speed agitation for the remainder of the reaction.

The polymerization process is suitably carried out in a conventional stationary polymerization reaction zone employing therein a conventional, reaction mixture-inert agitator, i.e. an agitation body, such as a propeller, impeller, stirring paddle, screw, bar or blade. Such agitation body or bodies are movable, but are not freely movable in the polymerization reaction zone. This is so since the agitation body or bodies are movable only in direct response to an agitator motor means, e.g. a variable speed conventional agitator motor, the agitation body or bodies being connected thereto by a linking means, such as a mechanical drive shaft, a magnetic field or the like, which connection limits the movement of the agitation body within the stationary reaction zone. Such limitation of movement of the agitator is highly desirable, since it substantially avoids undesirable impact of the agitatory body against the reactor wall as in moving reactor processes. Two-stage polymerization processes and equipment are described in British Pat. No. 1,047,489 and U.S. Pat. No. 3,522,227, the teachings of which are hereby incorporated herein by reference.

BRIEF DESCRIPTION OF THE INVENTION

The present invention relates to production of vinyl halidepolyolefin graft copolymers by a liquid phase bulk polymerization process wherein the process is carried out in the presence of a diluent. Suitable diluents are saturated hydrocarbons having from about 3 to about 15 carbon atoms and are soluble in vinyl chloride monomer under reaction conditions. Suitable diluents preferably have vapor pressure characteristics, generally in the neighborhood, within 100 psi, and similar liquid state viscosity, as the vinyl halide monomer component at the same temperature. The diluent is especially a liquid or gas at ambient conditions of temperature and pressure, i.e. at 20° C. and one atmosphere, respectively. The diluent is inert to the polymerization mass, that is, the diluent has no substituent groups capable of reacting with free radicals present in the polymerization mass, e.g. oxygen or sulfur groups. Preferably, the diluent is a straight or branched chain, or cyclic saturated hydrocarbon having from 3 to 15 carbon atoms, and more preferably, from 4 to 8 carbon atoms.

Illustrative examples of suitable diluents which can be employed in the present process include n-propane, n-butane, isobutane, isopentane, neopentane, 2-methyl pentane, 3-methyl pentane, 2,2-dimethyl butane, 2,3-dimethyl butane, cyclobutane, methylcyclobutane, cyclopentane, cyclohexane, 2,2,4-trimethyl pentane, 2,2,3-trimethyl pentane, n-tridecane and n-pentadecane. Mixtures of these and equivalent hydrocarbon alkanes and cycloalkanes can be used also.

Particularly useful diluents are n-propane, n-butane, isobutane or mixtures thereof. Preferably, the diluent is a branched chain saturated hydrocarbon alkane. Isobutane provides an especially satisfactory result in the practice of the invention.

The diluents may be utilized in a minor amount ranging between about 0.2 to less than about 50.0 percent based upon the total weight of the reaction charge. More preferable, is a range between about 0.5 to about 10.0 percent, especially a range between about 1.0 to about 10.0 percent, diluent. Less than about 0.2 percent generally does not yield a product having the improved color, particle size or low residual vinyl halide monomer content possible with the improvement of the present process. Although amounts of diluent greater than 10 percent may be used, use of more than about 30.0 percent diluent usually does not yield additional improvement consistent with economic practicability.

The present diluent may suitably be added at any point of the bulk polymerization process, i.e. at either the first or second stage of the process.

In conventional polymerization processes involving vinyl halide monomers, the conversion percentage, the percent of monomer converted to polymer, is usually halted when the conversion is in the range of 55 to 70 percent, because of the difficulty of degassing, that is, removing the unreacted or residual vinyl halide, from polymerized masses having higher conversion percentages. Typically, degassing is carried out by stopping the reaction when the conversion percentage is between 55 and 70 percent and placing the polymerization mass under a vacuum to remove the unreacted monomer, advantageously at an elevated temperature below the temperature at which the polymer product degrades. The polymerization mass after degassing typically contains between about 500 and 1500 or higher parts per million (ppm) of vinyl halide monomer, substantially above the desired 400 ppm or less.

The conditions of temperature and diminished pressure employed in the degassing of the present crude graft polymer product are those conventionally employed in isolating vinyl halide non-graft polymers from the polymerization mass. These conditions which, when employed in the present process, effectively remove the volatile vinyl halide monomer and the present volatile diluent from the graft polymer product of the invention, are described in F. A. Cich et al., U.S. Pat. No. 4,205,149, issued May 27, 1980, at column 3, lines 17–26, 31–33. The subject matter of the latter patent, which is directed to preparation of a conventional, i.e. non-graft, vinyl chloride polymer by liquid phase bulk polymerization in the presence of n-butane diluent, is incoporated herein by reference.

The use of the present diluents, in the above-indicated range, improves the degassability of the polymerization mass and allows conversions to be carried out in the range of from about 75 to about 85 and upwards to 90 percent with little or no detrimental effect on the degassification characteristics of the polymerization mass. The residual vinyl halide monomer in the degassed polymerization mass is typically lowered to substantially below 400 ppm and generally to less than 200 ppm and ideally to less than 50 ppm.

While it will be understood that the present invention is not deemed limited by theory of its operativeness, it is known that the present diluent swells the polyvinyl halide polymer being formed, and it is postulated that the modified swelling allows a diffusion of the polyolefin component into the formed or forming, polyvinyl halide polymer component instead of coating the formed particulate polymer. Thus, a product of more consistent composition and size is produced and agglomeration, lumping of the polymer product, is substantially reduced. Scale which forms on the reactor wall surface during the polymerization and which is a persistent problem in bulk liquid phase polymerizations of vinyl halide monomers is substantially reduced in amount (as compared to the corresponding polymerization without the present diluent) by the practice of the present invention. Moreover, such scale as is formed in the present process is found to be much more readily removed (as for example by mechanical scraping) compared to the scale which is formed when the graft polymerization is carried out in absence of the diluent.

The aforementioned swelling also increases the porosity of the polymer product and provides the mass with improved heat transfer capability by lessening the viscosity of the mass, especially during the "thick paste" stage (which generally occurs at a conversion of 15 to 35 percent of monomer to polymer) of the polymerization process. It is generally accepted that coloring or "pinking" of the polymerization mass, resulting in undesired color in the subsequent molded product, takes place in the polymerization process when an inadequate amount of vinyl halide monomer is left in the mass to remove heat from the formed particles. The polymerization mass of the present process has substantially reduced tendency to pink, and the products are of improved, i.e. consistently good, substantially white, color as compared to the corresponding product obtained in absence of the diluent. The reduced monomer content of the polymerization mass of the present invention may also be related to the swelling of the mass by the present diluents which provides improved mobility of the monomer component to inially react with the initiator, or subsequently if unreacted, to be removed from the mass.

The graft polymer product of the invention further exhibits an improved clarity and especially contact clarity, when compared in the form of extruded films (or plaques) to the corresponding graft polymer prepared in absence of the present diluent. The latter graft polymers when extruded as a film are generally transluscent but almost completely non-transparent (in contrast to the corresponding non-graft vinyl halide polymers prepared by conventional bulk liquid phase polymerization which are generally completely transparent). The films of the latter graft polymer products also contain numerous surface inclusions of small opaque particles of about 0.5 mm average diameter. In comparable films prepared from the present graft polymer product the clarity is substantially improved so that the films are semi-transparent and exhibit distinctively improved contact clarity compared to the films obtained from the corresponding graft polymer prepared in absence of the present diluent.

Moreover, the aforementioned opaque surface inclusion particles are almost completely absent in films prepared from the present graft copolymers.

The present polymerization process is carried out at temperatures between about 25° and about 90°, preferably, about 40° to about 80°, and especially about 50° to about 75° C. The reaction is carried out under autogenous pressure sufficient to maintain the reaction mass in the liquid state. The polymerization reaction is conducted in the presence of a small initiating amount of a free radical initiator for the reaction. Useful free radical initiators are organic or inorganic peroxides, persulfates, oxonates, hydroperoxides, peracids and percarbonates, diazonium salts, diazotates, peroxysulfonates, trialkyl borane-oxygen systems, amine oxides, and organic azo compounds, such as 2,2'-azo-bis-isobutyronitrile and 2,2'-azo-bis-2,4-dimethyl valeronitrile. Preferably, an organic azo compound or an organic peroxy compound, especially an organic peroxide, is used as the initiator. The initiator is used in a concentration ranging from about 0.01 to about 1.0 percent and, preferably, from about 0.05 to about 0.5 percent based on the total weight of all monomers in the reaction mixture. Organic initiators which are soluble in the bulk polymerization mas are especially useful and include the following representative examples: diisononanoyl peroxide, acetyl cyclohexylsulfonyl peroxide, di(2-ethylhexyl)peroxydicarbonate, t-butyl peroxyneodecanoate, lauroyl peroxide, benzoyl peroxide, diacetyl peroxide, azobisisobutyronitrile, diisopropyl peroxydicarbonate, azo-bisisobutyramidine hydrochloride, t-butyl peroxypivalate, 2,4-dichlorobenzoyl peroxide, and 2,2'-azobis-(2,4-dimethyl valeronitrile). These and other suitable initiators are more particularly described by J. Brandrup and E. H. Immergut, Editors "Polymer Handbook", Interscience Publishers, 1966, Chapter II entitled "Decomposition of Organic Free Radical Initiators", the pertinent disclosure whereof is incorporated herein by reference. Advantageously, the initiator which is used is chosen from a group of initiators known in the prior art as the "hot catalysts" or those which have a high degree of free-radical initiating activity. Initiators with a lower degree of activity are less desirable in that they require longer polymerization times.

In the preferred two-stage reaction configuration employed in the present bulk liquid phase process, the means chosen to agitate the monomer or monomers in the first stage is of a type capable of providing high shear agitation and is commonly referred to as a "radial turbine type" agitator. The speed of the turbine type agitator generally lies between 500 and 2000 revolutions per minute or a tip speed of about 2 to 7 meters per second in the first stage reactor. A tip speed of about 0.5 to about 2 meters per second is used in the second reactor stage. These figures should not be regarded as limiting values.

Although the present process may be utilized in any conventional liquid phase bulk polymerization processes having one or more stages, a particularly useful process modification is described in the aforementioned U.S. Pat. Nos. 4,007,235; 4,067,928 and 4,195,137 of L. E. Walker. In the process described in these patents, a sufficient amount of vinyl halide monomer is removed during the thick paste stage to adjust the concentration of the polyolefin component to above about 3.5 percent by weight, based upon the weight of the vinyl halide component remaining in the charge after the removal, the initial concentration of the polyolefin in the reaction mass being more than about 1.8% by weight based on the vinyl halide.

The vinyl halide utilized in the present process is preferably vinyl chloride, although other vinyl halides, such as vinyl fluoride and vinyl bromide, can also be employed.

The polymerization products of the present invention can be admixed with various conventional inert additives, such as fillers, dyes and pigments. In addition, the polymerization products can be admixed with plasticizers, lubricants, thermostabilizers and ultraviolet light stabilizers as described.

As described hereinabove, the present graft copolymers exhibit an improved porosity compared to the corresponding graft copolymer products obtained in absence of the diluent. The improved porosity of the present products advantageously facilitates absorbtion by the product of adjuvents of the type described above which are liquids, e.g. liquid plasticizers, when such liquid adjuvents are admixed with the present product.

In order to further illustrate the invention but without being limited thereto, the following examples are given. In this specification and claims, unless otherwise indicated, parts, percentages and proportions are by weight, and temperatures are in degrees centigrade.

DETAILED DESCRIPTION AND PREFERRED EMBODIMENT OF THE INVENTION

Example I

To a vertical type first stage reactor of 2.5 gallon capacity and stainless steel construction, equipped with a radial turbine-type agitator, a pressure sensor and a venting valve, there was added 6.82 Kg. vinyl chloride monomer, 2.2 ml. of di(2-ethylhexyl)peroxydicarbonate sold under the tradename "Lupersol 223M75". About 0.91 Kg. of vinyl chloride monomer are vented from the reactor in order to remove entrapped air. The reaction mass was then heated to about 70° under an autogeneous reaction pressure of about 167 psig. with the agitator operating at about 1500 rpm. and agitated at these conditions of temperature and pressure for about 25 minutes, after which period the conversion of vinyl chloride to vinyl chloride polymer was about 8% and the reaction mixture ready for transfer to the second stage reactor as described below.

Meanwhile, into the second stage reactor, a 5 gallon stainless steel vessel equipped with a spiral agitator operating at a speed of about 63 rpm., a pressure sensor and a venting valve, there was charged at 0° C., 544.8 g of Epsyn 40A (an ethylene propylenediene modified terpolymer of about 160,000 weight average molecular weight, wherein the ethylene-propylene ratio is about 55/45 and the diene is ethylidene norbornene present in an amount of 3±0.5 percent, manufactured by the Copolymer Corp.) which has been finely shredded and dusted with 109.0 g. of pulverulent bulk polymerized vinyl chloride polymer (to prevent agglomeration and promote dissolution of the polyolefin in the reaction mixture) and 0.4 g. of 2,6-di-t-butyl paracresol antioxidant color stabilizer. The mixture was freed of air by drawing a vacuum of about 29 inches of mercury in the reaction vessel and thereafter flooding the vessel with nitrogen. After repetition of the air removal treatment, 0.91 Kg. of isobutane, 1.0 ml. of the "Lupersol 223M75" initiator and about 10.0 gm. of dilauroyl peroxide and about 3.18 Kg. of additional vinyl chloride monomer were charged to the reactor, thereby providing a proportion of polyolefin based on monomer of about 6%. After the reaction vessel was sealed, the reaction mixture was heated under agitation to about 40°, and the first stage reaction mixture described hereinabove was added. The reaction mass was then maintained at the reaction temperature of about 72° C. under an autogeneous reaction pressure of about 175 psig. for a period of about 6 hours. At the end of the time period, a drop in the pressure in the reaction vessel indicated the substantial completion of the polymerization reaction. The reaction vessel was then heated to about 76° and any unreacted vinyl chloride monomer in the vessel vented therefrom over a one-hour period. To insure as complete as possible removal of vinyl chloride monomer residue from the product, the product was degassed in vacuo at 76° for about one hour and 15 min. and subsequently at about 0° for about one hour and then discharged from the reactor.

A pulverulent polymer product of excellent impact strength is obtained in a yield of about 7.36 Kg. (corresponding to a conversion of monomer to polymer of about 73.8%, based on monomer charged. About 88.9% portion of the product passes through a 10 mesh screen (U.S. Standard Sieve Series). The bulk density of the product was found to be 0.55.

Example I is shown in tabular form as Example I in the table below. Examples II and III were conducted in a similar manner, except the amount of isobutane diluent in Example II was decreased to 5% and in Example III, a control, no isobutane diluent was added.

| Example | % Isobutane | % Conversion | % of Product Retained on 10 Mesh Screen | % of Product Passing Through 10 Mesh Screen | Bulk Density of Product |
|---|---|---|---|---|---|
| I | 10 | 73.8 | 11.1 | 88.9 | 0.55 |
| II | 5 | 70.8 | 19.9 | 80.1 | 0.62 |
| III | 0 | 64.6 | 45.5 | 54.5 | 0.82 |

Example IV

In this example the process of the invention was conducted on a large scale. A charge of about 9,676 pounds of vinyl chloride monomer, 299 pounds of isobutane, 0.93 pounds of acetyl cyclohexylsulfonyl peroxide, 1.27 pounds of di(2-ethylhexy) peroxydicarbonate, and 825 pounds of Epsyn 40A was placed in a three baffle first stage reactor of 8 m$^3$ capacity. The reactor was constructed of stainless steel, equipped with a radial turbine-type agitator and accompanying upward pumping marine propeller-type agitator, pressure sensor, condensor and vent valves. The reactor was placed under a vacuum of about 1/7 atm. prior to the addition of the vinyl chloride monomer and isobutane components which were added as a mixture. The reactor was then heated to about 70° C. under an autogeneous pressure of 167 psig. with the agitator operating at about 200 rpm. The charge was agitated under these conditions for a period of about 25 minutes. At the end of such period, the conversion of vinyl chloride monomer to homopolymer and graft copolymer is about 10% and ready for transfer to the second stage.

The second stage horizontal reactor was fabricated of stainless steel with a capacity of 16 m$^3$. The reactor was equipped with a pressure sensor, a degassing filter, vent valves and a three-bladed stirrer of partial helix design. This reactor was charged with 0.46 pounds of acetyl cyclohexane sulfonyl peroxide in a solvent marketed under the name of "Lupersol 228Z", 1.80 pounds of t-butyl peroxyneodecanoate, 5.12 pounds of di(isononanoyl) peroxide, 0.2 pounds of 2,6-di-t-butyl paracresol antioxidant color stabilizer, and 50 ml. of 40% nitric acid to aid in retarding the formation of crusts during heat-up.

The second stage reactor was evacuated to about 1/7 atm. and charged with about 2,425 pounds of vinyl chloride monomer and about 75 pounds of isobutane. The reaction mass from the first stage reactor was then transferred into the second stage reactor. The first stage reactor was then rinsed with a mixture of about 7,760 pounds of vinyl chloride monomer and about 40 pounds of isobutane. The rinse was then added to the second stage reactor. The second stage reactor was then heated to 72° C. under an autogeneous pressure of about 175 psig. with agitation of 10 rpm. for a period of 4 hours.

During the first hour vinyl chloride monomer and isobutane were vented from the reactor at an approximate rate of 500 pounds per hour. During the second hour of the reaction approximately 1,500 pounds additional of the vinyl chloride monomer-isobutane mixture were removed from the reactor. At the end of two hours, 175 ml. of 50% ammonia was added to the reaction mass to neutralize any acid previously added or generated by the polymerization process. At the end of the reaction time, 10 liters of epoxidized soybean oil were added to the reaction mass to inhibit polymer degradation which may occur during the subsequent degassing-vacuum steam stripping steps. The unreacted vinyl chloride monomer and isobutane were then degassed to recovery at 85° C. until the reactor pressure had equilibrated with the pressure in the recovery system. At such time, the reactor was placed under vacuum degassing conditions of 85° C. and 2 psi. Steam was then added with a vacuum of about 8 psi for a period of 55 minutes. The steam addition was then discontinued and a vacuum of about 2 psi. maintained for 30 minutes. Nitrogen was then added to bring the reactor pressure to atmospheric and the reactor unloaded.

A pulverulent polymer product was recovered in a yield of about 12,000 pounds which corresponds to a conversion of monomer to polymer of about 55%, based upon the total monomer present at the start of the reaction time in the second stage reactor.

The product contained an average of 192 ppm. of residual vinyl chloride monomer. Under similar conditions with the exception that no isobutane diluent was added, the process produced a product having an average of 987 ppm. of residual vinyl chloride monomer.

While this invention has been described with reference to certain specific embodiments, it will be recognized by those skilled in the art that many variations are possible without departing from the spirit and scope of the invention.

What is claimed is:

1. A process of preparing a vinyl halide polymer which comprises polymerizing a reaction charge in bulk liquid phase, in the presence of from about 0.2 to less than about 50% by weight of the reaction charge of a straight or branched chain, or cyclic saturated hydrocarbon diluent inert to the polymerization mass containing from 3 to 15 carbon atoms, said charge comprised of vinyl halide monomer alone or in combination with up to 50% by weight based on the total weight of monomers of another ethylenically unsaturated monomer copolymerizable therewith, in the presence of from about 0.05% to about 20% by weight based on the vinyl halide monomer of a hydrocarbon olefin trunk polymer having a weight average molecular weight of about 50,000 to about 1,000,000, and a free radical initiator compound for said polymerization.

2. The process of claim 1 wherein the vinyl halide monomer is vinyl chloride and said trunk polymer is selected from the group consisting of:
 (a) a homopolymer of an aliphatic hydrocarbon olefin monomer of 2 to 8 carbon atoms,
 (b) a copolymer of two or more of said olefin monomers, and
 (c) a polymer of at least one of said olefin monomers and no more than 15% by weight, based on the weight of the polymer, of a non-conjugated aliphatic hydrocarbon polyene of 4 to 18 carbon atoms wherein all of the carbon-to-carbon double bonds do not form a conjugated system, said olefin polymer being soluble, partially soluble or dispersible in said monomer or monomers of the polymerization reaction.

3. The process of claim 1 wherein the diluent is selected from the group consisting of n-propane, n-butane, isobutane and mixtures thereof.

4. The process of claim 2 wherein the diluent is a branched chain hydrocarbon alkane of 4 to 8 carbon atoms.

5. The process of claim 4 wherein the diluent is isobutane.

6. The process of claim 1 wherein the diluent is present in an amount between about 1.0 and about 10.0 percent.

7. The process of claim 2 wherein said olefin polymer containing said polyene is an olefin terpolymer.

8. The process of claim 7 wherein said olefin terpolymer contains an aliphatic hydrocarbon diene as a monomer unit.

9. The process of claim 8 wherein the olefin terpolymer is an ethylene-propylene diene terpolymer.

10. The process of claim 8 wherein said diene is present in said olefin terpolymer in the proportion of up to about 6% by weight of said terpolymer.

11. The process of claim 1 wherein said olefin polymer is selected from the group consisting of an ethylene-propylene copolymer, an ethylene-propylene diene terpolymer, a propylene homopolymer, and a butene-1 ethylene copolymer.

12. The process of claim 11 wherein said olefin polymer is an ethylene-propylene copolymer.

13. The process of claim 1 comprising carrying out the polymerization in a first stage wherein the reaction mixture is subjected to high speed agitation until about 3% to about 20% by weight of said monomer or monomers have been converted to polymer and further polymerizing the resultant reaction mixture together with additional monomer or monomers in a second stage during which the reaction mixture is subjected to low speed agitation until the polymerization has been completed.

14. The process of claim 2 wherein the olefin polymer is an ethylene-propylene copolymer.

15. The process of claim 2 wherein the olefin polymer is polyethylene.

16. The process of claim 2 wherein the olefin polymer is polypropylene.

17. The process of claim 9 wherein said olefin polymer is ethylene-propylene-ethylidene norbornene terpolymer.

18. The process of claim 1 wherein the weight average molecular weight of said olefin polymer is about 50,000 to 300,000.

19. The process of claim 18 wherein the weight average molecular weight of said olefin polymer is about 50,000 to 300,000.

20. The process of claim 1 wherein the polymerized reaction mass is subjected to degassing to remove residual vinyl halide monomer and the diluent from the polymer product.

21. The product of the process of claim 1.
22. The product of the process of claim 2.
23. The product of the process of claim 5.
24. The product of the process of claim 8.
25. The product of the process of claim 13.
26. The product of the process of claim 31.

27. In the process of preparing a vinyl halide polymer which comprises polymerizing a reaction charge comprised of monomer consisting of vinyl halide monomer in bulk liquid phase, in the presence of from about 0.05% to about 20% by weight based on the vinyl halide monomer of a hydrocarbon olefin trunk polymer of at least one olefin monomer and no more than 15% by weight, based on the weight of the polymer, of a non-conjugated aliphatic hydrocarbon polyene of 4 to 18 carbon atoms wherein all of the carbon-to-carbon double bonds do not form a conjugated system, said olefin polymer being soluble, partially soluble or dispersible in said monomer or monomers of the polymerization reaction and said olefin polymer having a weight average molecular weight of about 50,000 to about 1,000,000, and a free radical initiator compound for said polymerization, the improvement which comprises carrying out said polymerization, in the presence of from about 0.5 to about 30% by weight of the reaction charge of a straight or branched chain, or cyclic saturated hydrocarbon diluent inert to the polymerization mass containing from 4 to 8 carbon atoms.

28. The process of claim 27 wherein the polymerization reaction mass is subjected to degassing to remove residual vinyl halide and the diluent from the polymer product.

29. The process of claim 28 wherein the vinyl halide monomer is vinyl chloride monomer and the diluent is isobutane.

30. The product of the process of claim 29.

31. In the process of preparing a vinyl halide polymer which comprises polymerizing a reaction charge in bulk liquid phase, said charge comprised of vinyl halide monomer alone or in combination with up to 50% by weight based on the total weight of monomers of another ethylenically unsaturated monomer copolymerizable therewith, in the presence of from about 0.05% to about 20% by weight based on the vinyl halide monomer of a hydrocarbon olefin trunk polymer having a weight average molecular weight of about 50,000 to about 1,000,000, and a free radical initiator compound for said polymerization, which is characterized by passing through a thick paste state, the improvement of carrying out the polymerization in the presence of from about 0.2 to less than about 50% by weight of the reaction charge of a straight or branched chain, or cyclic saturated hydrocarbon diluent inert to the polymerization mass containing from 3 to 15 carbon atoms, and removing from about 2% to less than about 50% by weight of the vinyl halide portion of the charge during said thick paste state of the polymerization process to adjust the concentration of said olefin trunk polymer after said removal to greater than about 3.5% by weight based on the vinyl halide remaining in the charge, the initial concentration of said olefin trunk polymer in said polymerization reaction mass being more than about 1.8% by weight based on the vinyl halide charged.

* * * * *